(12) United States Patent
Kito et al.

(10) Patent No.: US 9,483,041 B2
(45) Date of Patent: Nov. 1, 2016

(54) BLOCK EXECUTION SEQUENCE DISPLAY SYSTEM

(75) Inventors: Koji Kito, Toyota (JP); Terukazu Senda, Obu (JP)

(73) Assignee: JTEKT CORPORATION, Osaka-shi (JP)

( * ) Notice: Subject to any disclaimer, the term of this patent is extended or adjusted under 35 U.S.C. 154(b) by 742 days.

(21) Appl. No.: 13/491,919

(22) Filed: Jun. 8, 2012

(65) Prior Publication Data
US 2013/0006391 A1 Jan. 3, 2013

(30) Foreign Application Priority Data

Jun. 29, 2011 (JP) ................................ 2011-144523

(51) Int. Cl.
*G05B 19/05* (2006.01)
*G05B 19/409* (2006.01)

(52) U.S. Cl.
CPC ........... *G05B 19/058* (2013.01); *G05B 19/409* (2013.01)

(58) Field of Classification Search
CPC .. G05B 19/058; G05B 19/18; G05B 19/406; G05B 19/4063; G05B 19/4068; G05B 19/408; G05B 19/409; G05B 19/4093; G05B 19/4097; G05B 19/4099
USPC ................ 700/11, 17, 18, 83, 159, 247, 264
See application file for complete search history.

(56) References Cited

U.S. PATENT DOCUMENTS

| | | | |
|---|---|---|---|
| 5,426,730 A | 6/1995 | Miyake et al. | |
| 5,485,620 A * | 1/1996 | Sadre | G05B 19/41865 700/18 |
| 5,608,641 A * | 3/1997 | Guhl et al. | 700/185 |
| 6,290,403 B1 * | 9/2001 | Onishi | G05B 19/0426 712/200 |
| 6,859,898 B1 * | 2/2005 | Yamashita et al. | 714/55 |
| 7,089,531 B2 * | 8/2006 | Rutkowski | 717/113 |
| 2002/0046397 A1 | 4/2002 | Schmitt et al. | |
| 2002/0054098 A1 | 5/2002 | Schmitt et al. | |

(Continued)

FOREIGN PATENT DOCUMENTS

| | | |
|---|---|---|
| JP | 2001-5504 A | 1/2001 |
| WO | WO 95/23374 A1 | 8/1995 |

OTHER PUBLICATIONS

Allen-Bradley Classic 1785 PLC-5 Programmable Controllers User Manual, pp. 72-77 (Chapter 6), Apr. 1996 http://literature.rockwellautomation.com/idc/groups/literature/documents/um/1785-um001_-en-p.pdf.*

(Continued)

*Primary Examiner* — Nathan L Laughlin
(74) *Attorney, Agent, or Firm* — Oblon, McClelland, Maier & Neustadt, L.L.P.

(57) ABSTRACT

A block execution sequence display system includes: a machine tool that has numerical control and sequence control; a programmable controller that executes a sequence program; a numerical control device that executes a NC program; block execution sequence array display means for displaying a block execution sequence array in which sequence functional blocks and a NC program execution block are arranged in an execution sequence; selecting means for selecting one of blocks in the array; and NC functional block execution sequence array display means for, when the NC program execution block is selected by the selecting means, displaying a NC functional block execution sequence array in which a plurality of NC functional blocks are arranged in an execution sequence.

5 Claims, 5 Drawing Sheets

(56) References Cited

U.S. PATENT DOCUMENTS

2002/0054099 A1    5/2002  Schmitt et al.
2005/0027377 A1*   2/2005  Lucas .............. G05B 19/41845
                                                         700/28
2009/0326680 A1*  12/2009  Landgraf ........................ 700/49

OTHER PUBLICATIONS

Extended European Search Report issued Feb. 9, 2016 in Patent Application No. 12172397.7.

* cited by examiner

| N0001: | M91 |
|---|---|
| N0002: | G90G54(*$C002* COORDINATE SYSTEM *)G00X154.<br>(*$C110* HOLE X*)Y- 119.(*$C111* HOLE Y*)M103S6000<br>(*$C003* SPINDLE SPEED *)F1200.(*$C004* FEED SPEED *) |
| N0003: | G43Z250.(*$C112* INITIAL POINT Z*)<br>H00(*$C000* TOOL NUMBER *)M03M156 |
| N0004: | G00Z23135.(*$C113*R POINT Z*) |
| N0005: | G01Z23035.(*$C114* HOLE DEPTH (COORDINATE SYSTEM)Z*)G09 |
| N0006: | G00Z23135.(*$C113*) |

BLOCK EXECUTION SEQUENCE DISPLAY SYSTEM

INCORPORATION BY REFERENCE/RELATED APPLICATION

This application claims priority to Japanese Patent Application No. 2011-144523 filed on Jun. 29, 2011 the disclosure of which, including the specification, drawings and abstract, is incorporated herein by reference in its entirety.

BACKGROUND OF THE INVENTION

1. Field of the Invention

The invention relates to a block execution sequence display system for a numerical control device and a programmable controller for, for example, a machine tool.

2. Discussion of Background

In a machine tool, conventionally, a numerical control device is used to carry out axis control, and a programmable controller is used to control miscellaneous operations of, for example, miscellaneous equipments, other than the axis control. A program used in the numerical control device is a numerical control (NC) program written in a numerical control (NC) language. A program used in the programmable controller is a sequence program written in a program language, such as a ladder circuit diagram and a sequential function chart (SFC program). The ladder circuit diagram is a logical combination of signals by contacts and coils, and is suitable for visual recognition of a control circuit. The SFC program is written in a graphical program language that indicates a program in a plurality of divided steps in a flowchart form, and is suitable for representing the execution sequence and execution conditions of a program. The NC program and sequence program are programmed such that a series of operations are executed in a specified operation sequence by controlled axes and miscellaneous equipments that operate in association with each other.

A machine tool is often provided with a monitoring device as a peripheral device to, for example, monitor the operating states of such a numerical control device and a programmable controller, detect an abnormal or faulty portion, and debug a program. In a monitoring device for a programmable controller that uses a SFC program, as described in U.S. Pat. No. 5,426,730, the SFC program is graphically displayed on, for example, a display, and an active step or transition is displayed with, for example, a background color different from that of the other portions. Thus, an operator is able to visually recognize a currently executed portion of the SFC program easily. Therefore, for example, detection of an abnormal or faulty portion is facilitated.

However, in a machine tool in which control is executed by a combination of a numerical control device and a programmable controller, a control program is formed of a NC program and a sequence program that are different in type. Therefore, the execution sequence and execution status are not easily recognized with the use of a monitoring device. For example, the execution sequence of processes shown as steps in a SFC program is easily understood from the displayed information. However, with regard to processes of NC program operations included in a series of processes, the contents and execution sequence of a NC program are not easily visually recognized. The monitoring device is able to display a control circuit formed of, for example, a ladder circuit that is an action associated with a step when the step in the SFC program is selected. However, when a step associated with a NC program operation is selected, a control circuit that starts up the NC program is displayed, and the contents of the NC program are not visually recognized. Therefore, in order to visually recognize the contents and execution sequence of a NC program, the NC program is separately retrieved, and the contents and execution sequence of the NC program are understood from the displayed NC language. Therefore, visually recognizing the contents and execution sequence of a NC program takes time and effort and requires knowledge about NC language.

In order to, for example, detect an abnormal or faulty portion or debug a program, the contents of a sequence program need to be checked from a NC program in some cases. For example, a command for miscellaneous equipment, written within a NC program and called an M code command, corresponds to an input condition for a control circuit for the miscellaneous equipment. The entity of the control circuit for the miscellaneous equipment is present in a program portion formed of, for example, a ladder circuit diagram that differs from the SFC program within the sequence program. Therefore, in order to check the contents of the sequence program that corresponds to the M code command from the NC program, the program portion formed of, for example, the ladder circuit diagram needs to be separately retrieved and the control circuit for the miscellaneous equipment, which corresponds to the M code command, needs to be found from the displayed circuit. This is not easy. In a situation where a trouble occurs in a machine tool and the cause of the trouble has to be found as soon as possible, if a lot of time is consumed to find a stop point of the NC program and a control circuit, a manufacturing line stops for a long time.

SUMMARY OF THE INVENTION

The invention provides a block execution sequence display system that is able to structurally and visually represent the entirety of a control program formed of a sequence program and a NC program to allow easy recognition of the execution sequence and execution status of the control program.

According to a feature of an example of the invention, a block execution sequence array in which sequence functional blocks of a sequence program and a NC program execution block are arranged in an execution sequence are displayed on a display device by block execution sequence array display means.

According to another feature of an example of the invention, operations of a NC program are displayed as a NC functional block execution sequence array, and each of the NC functional blocks of the NC functional block execution sequence array is displayed as a NC block execution sequence array. Thus, it is possible to represent the NC program as a hierarchical structure.

According to a further feature of an example of the invention, sequence functional blocks included in each of the NC functional blocks are displayed on the display device.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein.

DETAILED DESCRIPTION OF EMBODIMENTS

Hereinafter, an embodiment of the invention will be described with reference to the accompanying drawings.

Figure 1:
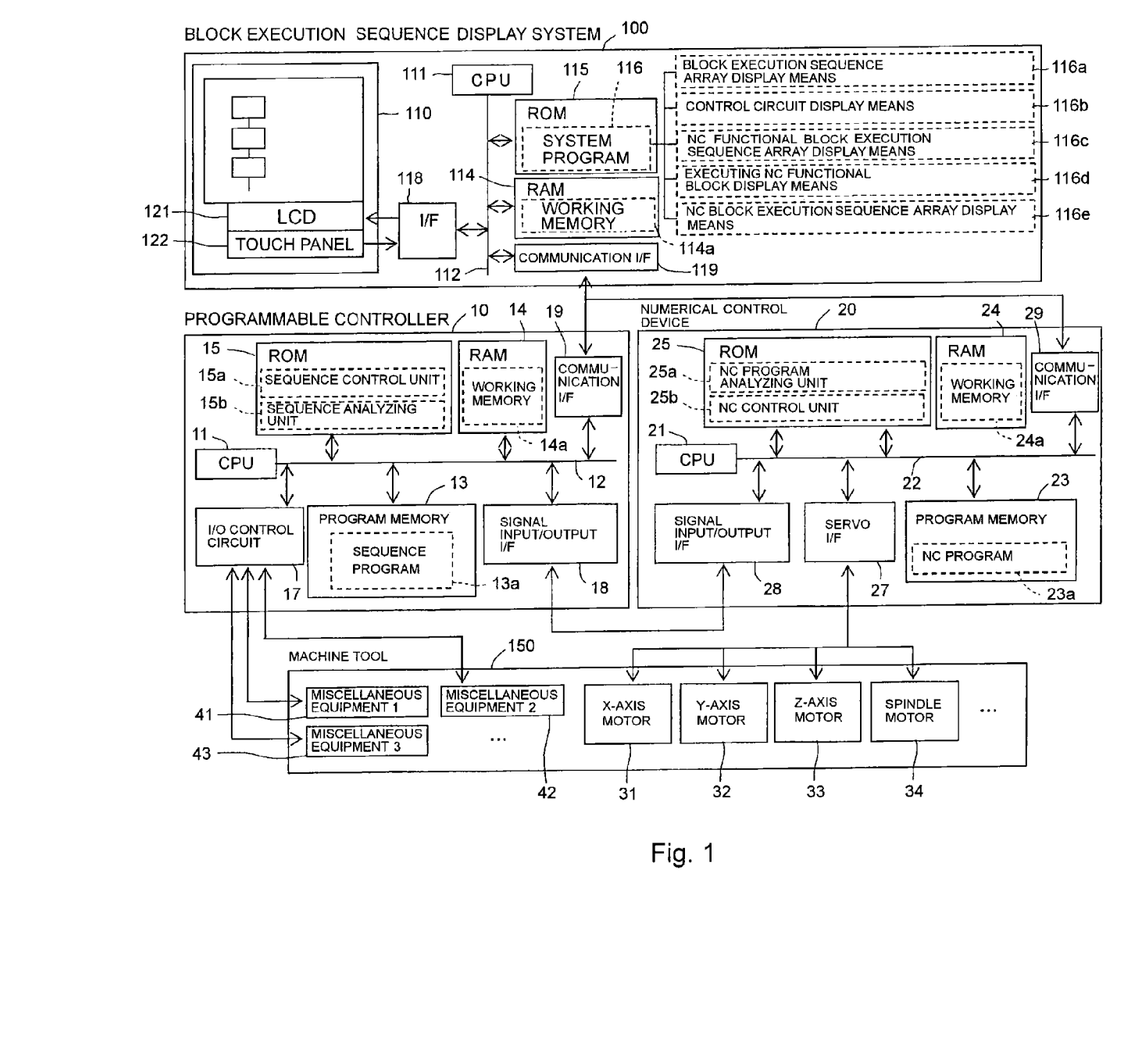
FIG. 1 is a block diagram that shows the configuration of a block execution sequence display system according to an embodiment of the invention.

The configuration of a block execution sequence display system 100 according to the present embodiment will be described. As shown in FIG. 1, in a programmable controller 10, a program memory 13, a RAM 14, a ROM 15, an I/O control circuit 17, a signal input/output interface 18 and a communication interface 19 are connected to each other via an internal bus 12 of a CPU 11.

In a numerical control device 20, a program memory 23, a RAM 24, a ROM 25, a servo interface 27, a signal input/output interface 28 and a communication interface 29 are connected to each other via an internal bus 22 of a CPU 21.

A display unit 110 is formed of an LCD 121 and a touch panel 122. The touch panel 122 is formed of a transparent electrode plate that covers the LCD 121.

In the block execution sequence display system 100, a RAM 114, a ROM 115, a display unit interface 118 and a communication interface 119 are connected to each other via an internal bus 112 of a CPU 111.

The programmable controller 10 and the block execution sequence display system 100 are connected to each other via the respective communication interfaces 19, 119. Similarly, the numerical control device 20 and the block execution sequence display system 100 are connected to each other via the respective communication interfaces 29, 119. The programmable controller 10 and the numerical control device 20 are connected to each other via the respective signal input/output interfaces 18, 28.

A machine tool 150 that is a control target includes miscellaneous equipments 41, 42, 43 via the I/O control circuit 17 of the programmable controller 10. In addition, the machine tool 150 includes motors 31, 32, 33, 34 for respective controlled axes via the servo interface 27 of the numerical control device 20.

The ROM 15 of the programmable controller 10 stores a sequence control unit 15a and a sequence analyzing unit 15b that are included in a system program. The RAM 14 has a working memory 14a that is used when the system program executes a sequence program 13a. The program memory 13 stores the sequence program 13a. The sequence program 13a is formed of a SFC program for controlling the operation of the machine tool 150 and a ladder circuit diagram for controlling the miscellaneous equipments 41, 42, 43. The system program is executed by the CPU 11 to control the entirety of the programmable controller 10.

The ROM 25 of the numerical control device 20 stores a NC program analyzing unit 25a and a NC control unit 25b that are included in a system program. The RAM 24 has a working memory 24a that is used when the system program executes a NC program 23a. The program memory 23 stores the NC program 23a written in a NC language for controlling the axis operation of the machine tool 150. The system program is executed by the CPU 21 to control the entirety of the numerical control device 20.

The ROM 115 of the block execution sequence display system 100 stores block execution sequence array display means 116a, control circuit display means 116b, NC functional block execution sequence display means 116c, executing NC functional block display means 116d, and NC block execution sequence display means 116e that are all included in a system program 116. The RAM 114 has a working memory 114a that is used when the system program 116 executes the above display means 116a to 116e. The system program is executed by the CPU 111 to control the entirety of the block execution sequence display system 100, and the above display means 116a to 116e are called upon operator's operation as needed. The above display means 116a to 116e display information on the display unit 110 via the display unit interface 118.

Figure 2:
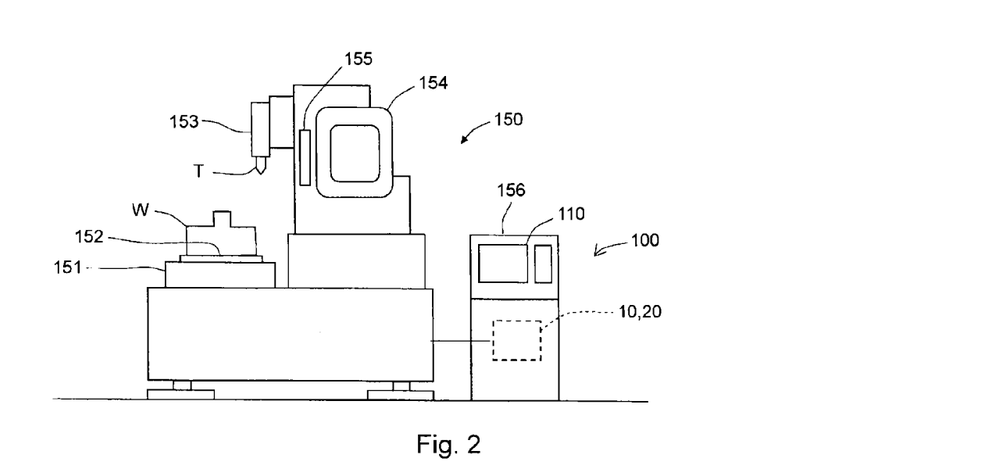
FIG. 2 is a schematic view of a machine tool to which the block execution sequence display system according to the embodiment of the invention is applied.

Next, an example in which the present embodiment is applied to a machine tool 150 will be described. As shown in FIG. 2, the machine tool 150 is a so-called machining center that has a table 151 and a spindle head 153. A tool T is mountable on the spindle head 153. Drive motors are connected to respective axis portions, and are controlled by the numerical control device 20. A jig clamp device (not shown) and a coolant supply unit (not shown) are provided at the front face portion. The jig clamp device is used to fix a workpiece W on a pallet. A tool magazine 154 and an automatic tool changer (ATC) 155 are provided at the side face portion. The programmable controller 10, the numerical control device 20 and the block execution sequence display system 100 are stored in a control box 156, and are connected to the axis motors and miscellaneous equipments of the machine tool 150 via an interface. In addition, the display unit 110 is provided on the front face of the control box 156. The coolant supply unit and the ATC 155 correspond to the miscellaneous equipments. The operations of the coolant supply unit and ATC 155 are controlled according to M code commands from a NC program.

Next, the operation of the block execution sequence display system 100 according to the present embodiment will be described. The overall control over the machine tool 150 is executed according to the SFC program of the sequence program 13a stored in the program memory 13 of the programmable controller 10. The SFC program is basically formed of a plurality of steps that represent control procedure, links that connect these steps to each other and transitions that represent conditions of transition from one step to the next step. A workpiece W is machined according to the NC program 23a that is prepared for each workpiece W and that is stored in the program memory 23 of the numerical control device 20. The NC program 23a is started from one of the steps of the SFC program. The miscellaneous equipments are controlled according to the ladder circuit diagram of the sequence program 13a stored in the program memory 13 of the programmable controller 10. Commands for the miscellaneous equipments may be issued from either one of the sequence program 13a and the NC program 23a. Note that the sequence program 13a and the NC program 23a are created by respective creating devices, or the like.

The NC program creating device refers to a machining drawing for a workpiece W and sets machining condition parameters on the basis of a portion of the workpiece W to be machined and the type of machining. Thus, the NC program creating device is able to create blocks of the corresponding NC program. The thus created blocks of the NC program for each portion to be machined and each type of machining are called NC functional blocks. The entirety of the thus created NC program 23a is configured such that NC functional blocks are arranged in an execution sequence and each of the NC functional blocks includes successive NC blocks corresponding to an operation.

Figure 3:
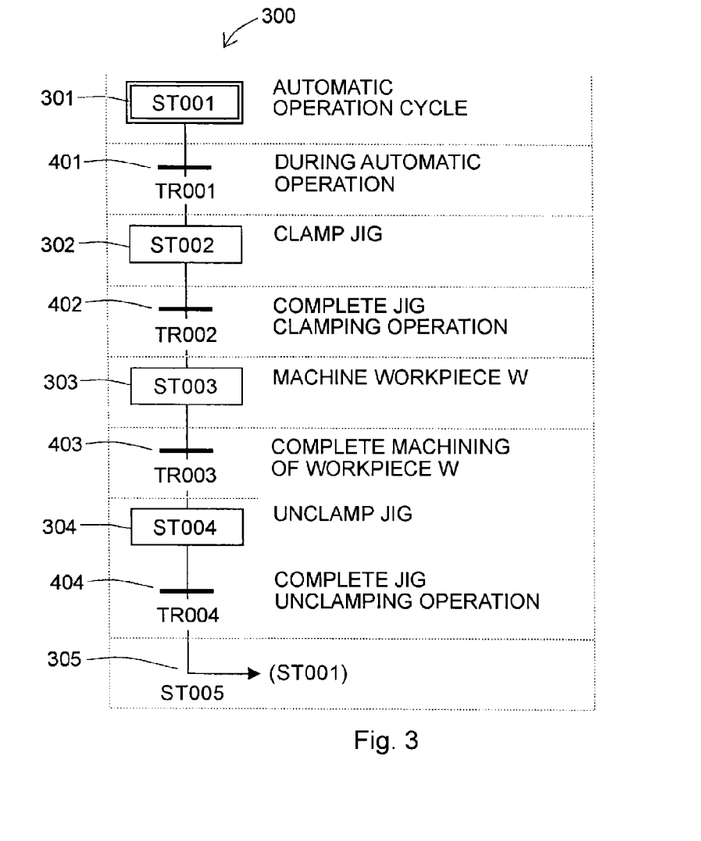
FIG. 3 is an example of a block execution sequence array displayed by the block execution sequence display system according to the embodiment of the invention.

The SFC program shown in FIG. 3 is the SFC program of an automatic operation cycle executed when the machine tool 150 performs automatic operation to machine a workpiece W. The SFC program is started from the first step ST001. Step ST001 is called initial step, and indicates the start point of the program. Step ST002 is linked to step ST001, and is sequentially linked to step ST003, step ST004 and step 305. In addition, transition TR001, transition TR002, transition TR003 and transition TR004 are arranged between the consecutive steps. Although not shown in the drawing, step 305 corresponds to ST005 and is called jump step. The jump step indicates that an execution point of the program is jumped to a specified step.

The SFC program is started from the initial step ST001, and performs jig clamping to clamp a workpiece W in the next step ST002. The clamping operation is controlled according to the sequence program 13a. The transition TR002 is provided with a program that uses completion of jig clamping operation as a transition condition, so, when a jig clamping operation completion signal has been detected, the process proceeds to the next step ST003. In step ST003, machining of the workpiece is started according to the NC program for machining the workpiece W. The step ST003 is provided with a program that starts the NC program 23a for machining the workpiece W. The comment of step ST003 indicates that the NC program 23a is used to machine the workpiece W.

As shown in FIG. 1, in the numerical control device 20, when the NC program 23a for machining the workpiece W is started from the programmable controller 10, the NC program 23a for machining the workpiece W is acquired from the program memory 23 and transferred to the NC program analyzing unit 25a. The NC program analyzing unit 25a analyzes the description written in the NC language, and transfers the analysis result to the NC control unit 25b. The NC control unit 25b executes axis control and device control in accordance with the analysis result. Axis commands are output to the respective axis motors 31, 32, 33 and spindle motor 34 via the servo interface 27. M code commands for the respective miscellaneous equipments 41, 42, 43 are transmitted to the programmable controller 10 via the signal input/output interface 28. Then, the programmable controller 10 operates the miscellaneous equipments 41, 42, 43 via the I/O control circuit 17 on the basis of the results processed by the control circuits using the M code commands, acquired via the signal input/output interface 18, as input conditions.

Then, the transition TR003 in FIG. 3 is provided with a program that uses completion of machining of the workpiece W as a transition condition, so, when a machining completion signal has been detected, the process proceeds to the next step ST004. In step ST004, jig unclamping is performed. The transition TR004 is provided with a program that uses completion of jig unclamping operation as a transition condition, so, when a jig unclamping operation completion signal has been detected, the process proceeds to the next step 305 (that corresponds to step ST005). In step ST005, the execution point of the program is jumped to the first step ST001 that is the specified jump step. The SFC program of which the execution point of the program has been returned to the first step ST001 repeats the above-described operations. Thus, the automatic operation cycle for machining a workpiece W is successively carried out.

In the block execution sequence display system 100, the execution status of the above automatic operation cycle is displayed on the display unit 110. The block execution sequence array display means 116a acquires the SFC program for automatic operation cycle from the programmable controller 10 via the communication interfaces 19, 119. Then, sequence functional blocks and a NC program execution block are arranged in a vertical line in an execution sequence into the form of a block execution sequence array 300, and then displayed on the display unit 110. Thus, the block execution sequence array 300 is displayed as shown in FIG. 3. In the block execution sequence array 300, the operations of the sequence program 13a and the operations executed according to the NC program 23a each are set as a single block, and the blocks are displayed in an array in an execution sequence of operations without distinguishing the sequence program 13a and the NC program 23a from each other. Therefore, it is possible to easily recognize the outline and execution sequence of the operations of the machine tool 150. The block execution sequence array 300 is in the same form as the so-called SFC program of the sequence program 13a. During execution of the automatic operation cycle, in the block execution sequence array 300, for example, the background color of a block that is currently executed is made different from the background color of the other blocks on the display so that the block that is currently executed is distinguishable from the other blocks. Thus, even when a machine trouble, or the like, occurs during execution of the automatic operation cycle and execution of the automatic operation cycle stops, it is possible to easily acquire the block at which the execution of the automatic operation cycle is stopped.

The block execution sequence array 300 is displayed on the display unit 110 by the block execution sequence array display means 116a. When an operator touches a step in the block execution sequence array 300 through the touch panel 122, which may function as selecting means, the contents of the step are displayed. How to display the contents of a step varies depending on whether the selected step is a sequence functional block or a NC program execution block.

For example, when step ST002 that is a sequence functional block is selected, the system program 116 calls the control circuit display means 116b. The control circuit display means 116b acquires the ladder circuit diagram of the sequence program 13a from the programmable controller 10 via the communication interfaces 19, 119. Then, a control circuit corresponding to step ST002 is retrieved from the ladder circuit diagram, and the retrieved control circuit is displayed on the display unit 110.

Figure 4:
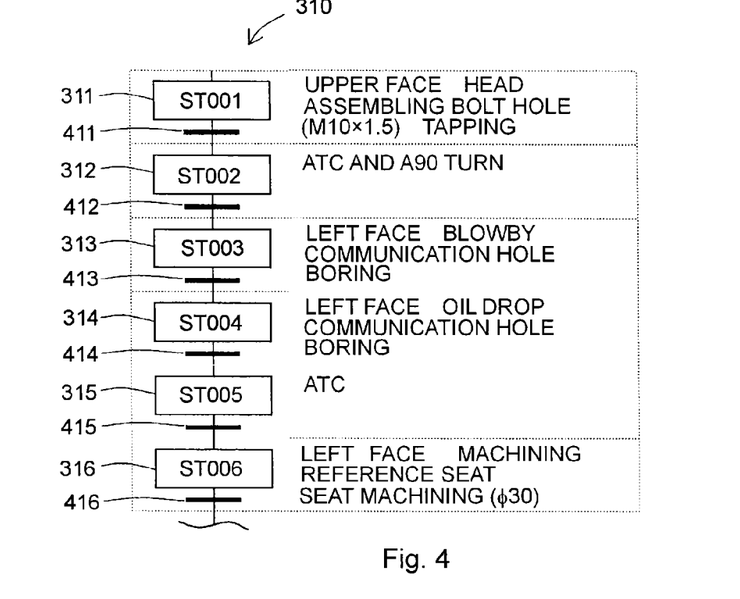
FIG. 4 is an example of a NC functional block execution sequence array displayed by the block execution sequence display system according to the embodiment of the invention.

When step ST003 that is a NC program execution block is selected, the system program 116 calls the NC functional block execution sequence display means 116c. The NC functional block execution sequence display means 116c acquires the NC program 23a that corresponds to machining of the workpiece W, written in the comment of step ST003, from the numerical control device 20 via the communication interfaces 29, 119. The NC program 23a is created by the above-described NC program creating device, so the NC program 23a is configured such that NC functional blocks for respective portions to be machined and types of machining are arranged in an execution sequence. Then, the NC functional blocks are arranged in a vertical line in an execution sequence into the form of a NC functional block execution sequence array 310, and then displayed on the display unit 110. Thus, the NC functional block execution sequence array 310 as shown in FIG. 4 is displayed. In the NC functional block execution sequence array 310, a NC functional block for each portion to be machined and each type of machining is set as one block and then the NC functional blocks are arranged and displayed in an operation execution sequence. Therefore, the outline and operation sequence of NC program operations are easily recognized.

Note that transitions 411 to 416 are provided so that the form of the NC program is in agreement with the form of the SFC program of the sequence program 13a, and represent completion of NC functional blocks, not program elements. During execution of the NC program 23a, for example, the executing NC functional block display means 116d makes the background color of a currently executed NC functional block different from the background color of the other blocks so that the currently executed NC functional block is distinguishable from the other blocks. Thus, even when a machine trouble, or the like, occurs during execution of the NC program 23a and execution of the NC program 23a stops, it is possible to easily acquire the NC functional block at which the execution of the NC program 23a stops.

Figure 5:
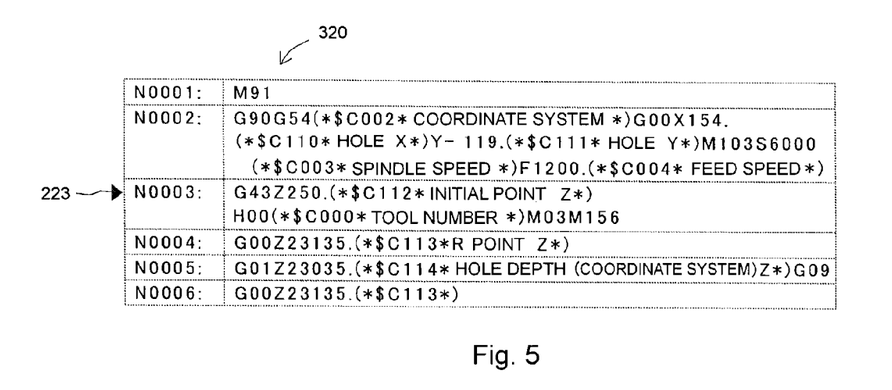
FIG. 5 is an example of the list form of a NC block execution sequence array displayed by the block execution sequence display system according to the embodiment of the invention.

The NC functional block execution sequence array 310 is displayed on the display unit 110 by the NC functional block execution sequence array display means 116a. When the operator touches a step of a NC functional block in the NC functional block execution sequence array 310 through the touch panel 122, which may function as the selecting means, the system program 116 calls the NC block execution sequence array display means 116e to display a NC block execution sequence array 320 of that step. For example, when step ST001 is selected, the NC block execution sequence array display means 116e acquires the NC functional block associated with step ST001 from the NC program 23a of O number (O0010). Then, as shown in FIG. 5, the NC block execution sequence array display means 116e displays the NC block execution sequence array 320 in a list form on the display unit 110. In the NC block execution sequence array 320 in a list form, NC blocks that correspond to the selected step are arranged in an execution sequence. Thus, the NC block execution sequence array 320 is displayed as shown in FIG. 5. In the NC block execution sequence array 320, a NC block is displayed as one block and NC blocks are displayed in an array in an execution sequence of operations. Therefore, the outline and operation sequence of the operations of the NC program 23a are easily recognized. Each NC block has numerical control information and a sequence functional block. The numerical control information is formed of an N number and a command written in the NC language. The NC program 23a is executed in block unit at the same time.

In addition, during execution of the NC program 23a, the NC block execution sequence array display means 116e displays a currently executing mark 223 at, for example, an N number portion so that a currently executed NC block is distinguishable from the other blocks. Thus, even when a machine trouble, or the like, occurs during execution of the NC program 23a and execution of the NC program 23a stops, it is possible to easily acquire NC block at which execution of the NC program 23a stops.

Figure 6:
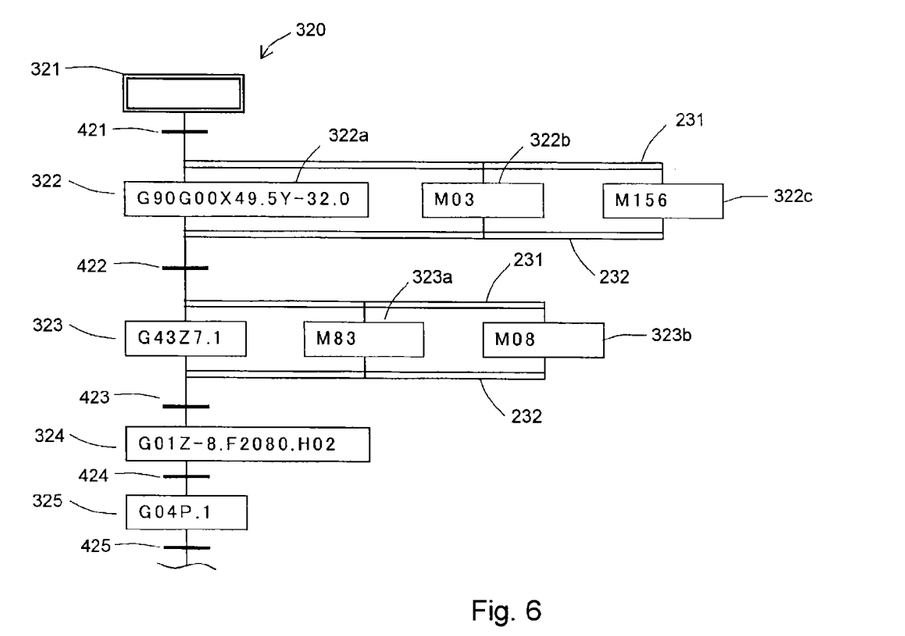
FIG. 6 is an example of the NC block execution sequence array of FIG. 5, displayed in a SFC program form.

Furthermore, the NC block execution sequence array display means 116e is also able to display the NC block execution sequence array 320 in the SFC program form of the sequence program 13a as in the case of the block execution sequence array 300. The NC block execution sequence array display means 116e arranges the NC language commands of NC blocks in a vertical direction in an execution sequence, and displays the numerical control information and sequence functional block of each NC language command in parallel with each other as separate blocks. Thus, the NC block execution sequence array 320 is displayed as shown in FIG. 6. The blocks that are parallel to each other are provided with upper double lines and lower double lines that indicate a parallel branch 231 and a parallel join 232, respectively, so that the form of the NC program is in agreement with the SFC program form of the sequence program 13a. Note that these double lines are not program elements. Transitions 421 to 425 are also provided so that the form of the NC program is in agreement with the SFC program form of the sequence program 13a. The transitions 421 to 425 represent completion of NC blocks, not program elements.

In addition, during execution of the NC program 23a, the above-described NC block execution sequence array display means 116e, for example, makes the background color of a currently executed block different from the background color of the other blocks so that the currently executed block is distinguishable from the other blocks in the SFC program form. Thus, even when a machine trouble, or the like, occurs during execution of the NC program 23a and execution of the NC program 23a stops, it is possible to easily acquire the NC block at which the NC program 23a stops. Furthermore, numerical control information and sequence functional blocks are displayed separately, so it is possible to easily recognize the execution statuses for M code commands.

Figure 7:
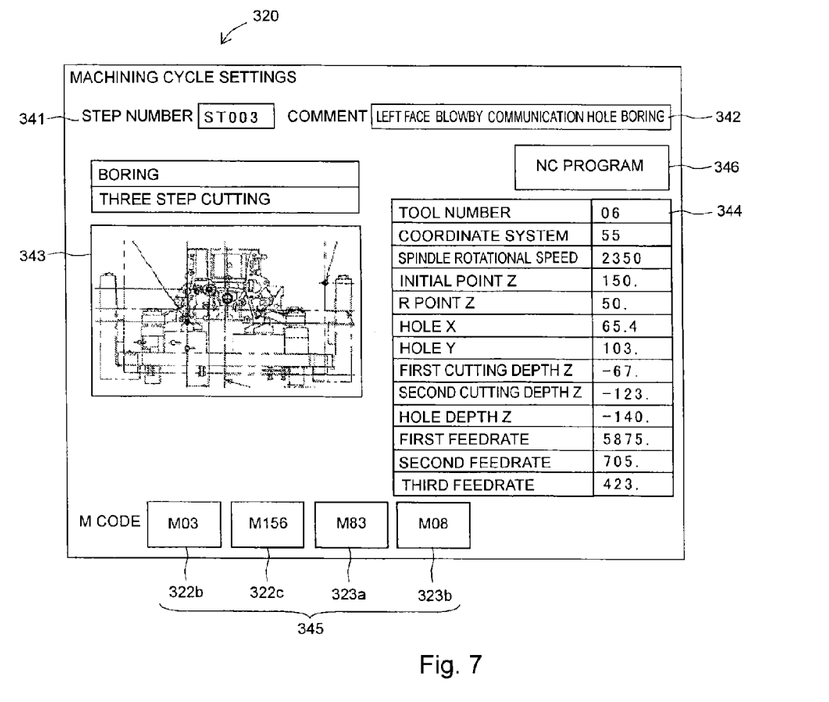
FIG. 7 is an example of the NC block execution sequence array of FIG. 5, displayed in a dialog form.

In addition, the NC block execution sequence array display means 116e is also able to display the NC block execution sequence array 320 in a dialog screen form. The NC block execution sequence array display means 116e acquires parameters 344 and a workpiece machining drawing 343 from a database. The parameters 344 indicate machining conditions that correspond to a NC functional block. The workpiece machining drawing 343 corresponds to the NC functional block. Furthermore, a sequence functional block 345 formed of M code commands that correspond to miscellaneous equipments used in the NC functional block is acquired. Then, a dialog screen in which the parameters 344, the workpiece machining drawing 343 and the sequence functional block are arranged is displayed. Thus, the dialog screen of the NC block execution sequence array 320 is displayed as shown in FIG. 7. With this configuration, the parameters 344 of the machining conditions that correspond to the NC functional block are seen while the workpiece machining drawing 343 is referred to. The dialog screen is similar to the screen for creating an intended NC functional block in the above-described NC program creating device.

In addition, when an operator touches a NC program button 346 provided on the dialog screen through the touch panel 122, which may function as the selecting means, the NC block execution sequence array 320 (FIG. 5) in a list form, in which NC blocks that correspond to the NC functional block are arranged in an execution sequence, or the NC block execution sequence array 320 (FIG. 6) in a SFC program form is displayed on the display unit 110.

In addition, during execution of the NC program 23a, the above-described NC block execution sequence array display means 116e, for example, makes the background color of a currently executed block different from the background color of the other blocks so that the currently executed block is distinguishable from the other blocks on the dialogue screen. Thus, it is possible to easily acquire the contents of machining of the NC functional block. Furthermore, sequence functional blocks are separately displayed, so it is possible to easily recognize the execution statuses for M code commands.

Figure 8:
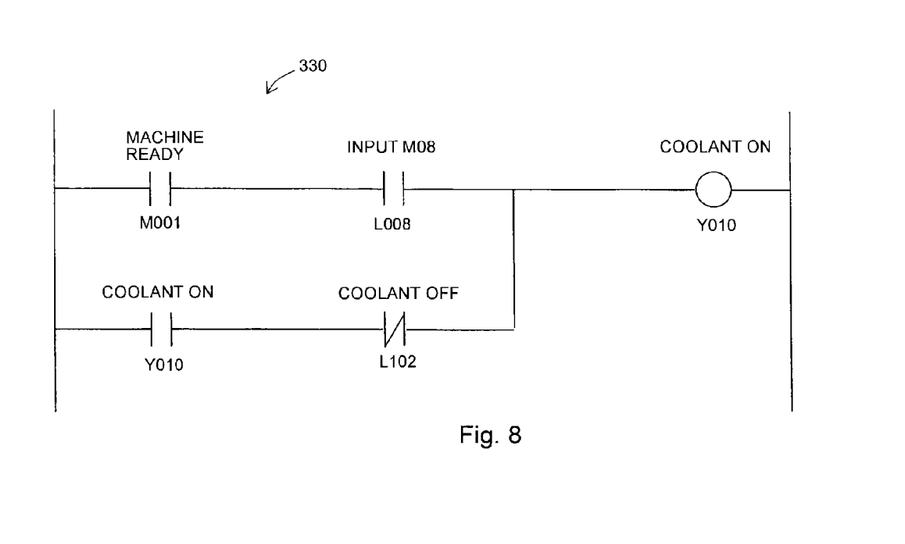
FIG. 8 is an example of a control circuit displayed by the block execution sequence display system according to the embodiment of the invention.

The NC block execution sequence array display means 116e displays the above-described NC block execution sequence array 320 in a SFC program form (FIG. 6) and in a dialog form (FIG. 7). When the operator touches a sequence functional block in the NC block execution sequence array 320 through the touch panel 122, which may function as the selecting means, the system program 116 calls the control circuit display means 116b. For example, in the case where a machine trouble regarding a miscellaneous equipment occurs during execution of the NC program 23a and the execution of the NC program 23a stops, when the sequence functional block of the M code command (M08), displayed in the SFC program form (FIG. 6) and dialog form (FIG. 7) of the NC block execution sequence array 320, is selected, the control circuit display means 116b acquires a ladder circuit diagram from the programmable controller 10 via the communication interfaces 19, 119. Then, the control circuit that uses the M08 command as an input condition is retrieved from the ladder circuit diagram, and the retrieved control circuit 330 is displayed on the display unit 110. Thus, the control circuit 330 is displayed. By checking the control circuit 330, it is possible to easily recognize the execution status of the miscellaneous equipment.

Note that, in the present embodiment, the touch panel 122 is used as the selecting means of the block execution sequence display system 100; instead, a mouse, a keyboard, or the like, may be used.

What is claimed is:

1. A block execution sequence display system, comprising:
    a machine tool that includes a plurality of movable members that are configured to be movable through numerical control and a plurality of miscellaneous equipments that are operated through sequence control;
    a programmable controller that executes a sequence program in which control circuits respectively included in a plurality of sequence functional blocks that respectively represent operations of the plurality of miscellaneous equipments are arranged in an operation sequence;
    a numerical control device that executes a numerical control (NC) program in which NC blocks are arranged in an execution sequence, each NC block including at least one of numerical control information for moving the corresponding movable member through numerical control and the sequence functional block to be executed;
    a first display image generator that displays a block execution sequence array in which the plurality of sequence functional blocks and a NC program execution block that represents execution of the NC program are arranged serially in an execution sequence, and a plurality of transition blocks are located between each sequence functional block and NC execution block on a display device, wherein the transition blocks use completion of the respective functional block and NC program block as a transition condition;
    a selection device that receives selection of one of display of the plurality of sequence functional blocks and display of the NC program execution block, the plurality of sequence functional blocks and the NC program execution block being included in the block execution sequence array displayed, on the display device;
    a second display image generator that, when the NC program is created so as to include a plurality of divided NC functional blocks each including a plurality of the successive NC blocks that correspond to a series of associated operations and the NC program execution block is selected by the selection device, displays a NC functional block execution sequence array in which the plurality of NC functional blocks are arranged in an execution sequence in the NC program, on the display device; and
    a third display image generator that, when one of the NC functional blocks is selected by the selection device from the NC functional block execution sequence array displayed on the display device, displays a NC block execution sequence array, in which a plurality of the NC blocks included in the one of the NC functional blocks are arranged in an execution sequence, on the display device,
    wherein
    the third display image generator separately displays sequence functional block corresponding to the one of the NC functional blocks, selected by the selection device, on the display device,
    the third display image generator displays the numerical control information and the sequence functional block that are included in each of the NC blocks in the NC block execution sequence array in parallel with each other, and
    each numerical control information and each sequence functional block includes only one piece of control information.

2. The block execution sequence display system according to claim 1, wherein the first display image generator displays a block, currently executed in the machine tool, among the plurality of sequence functional blocks and the NC program execution block on the block execution sequence array such that the currently executed block is distinguishable from the other blocks.

3. The block execution sequence display system according to claim 1, wherein the second display image generator displays one of the NC functional blocks, currently executed in the machine tool, on the NC functional block execution sequence array such that the currently executed NC functional block is distinguishable from the other NC functional blocks.

4. The block execution sequence display system according to claim 1, wherein the third display image generator includes a fourth display image generator that displays one of the NC blocks, currently executed in the machine tool, in the NC block execution sequence array such that the currently executed NC block is distinguishable from the other NC blocks.

5. The block execution sequence display system according to claim 1, further comprising:
    a fifth display image generator that, when one of the sequence functional blocks is selected by the selection device from the block execution sequence array displayed on the display device, displays the control circuit, included in the one of the sequence functional blocks, on the display device.

* * * * *